United States Patent
Maroney et al.

(10) Patent No.: US 8,106,769 B1
(45) Date of Patent: Jan. 31, 2012

(54) SYSTEMS AND METHODS FOR AUTOMATED HOUSE DAMAGE DETECTION AND REPORTING

(75) Inventors: Judd Hoyt Maroney, San Antonio, TX (US); Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 293 days.

(21) Appl. No.: 12/492,437

(22) Filed: Jun. 26, 2009

(51) Int. Cl.
*G08B 21/00* (2006.01)
(52) U.S. Cl. ....................................... 340/540
(58) Field of Classification Search ............ 340/540, 340/602, 539.1, 601; 700/284
See application file for complete search history.

(56) References Cited

U.S. PATENT DOCUMENTS

| | | | | |
|---|---|---|---|---|
| 4,110,945 A * | 9/1978 | Sheahan | ................ | 52/173.1 |
| 5,748,092 A * | 5/1998 | Arsenault et al. | ............ | 340/604 |
| 5,818,340 A * | 10/1998 | Yankielun et al. | ............ | 340/602 |
| 6,167,666 B1 | 1/2001 | Kelly | | |
| 2005/0192963 A1 | 9/2005 | Tschiegg et al. | | |
| 2008/0143349 A1 | 6/2008 | Lorenz et al. | | |
| 2008/0184272 A1* | 7/2008 | Brownewell | ................ | 719/318 |
| 2008/0282817 A1* | 11/2008 | Breed | ................ | 73/865.9 |
| 2009/0044595 A1 | 2/2009 | Vokey | | |

OTHER PUBLICATIONS

Safak, E. et al.: "Real-Time Structural Monitoring and Damage Detection by Acceleration and GPS Sensors", 8th US National Conference on Earthquake Engineering, San Francisco, California, Apr. 18-22, 2006, 10 pages.

* cited by examiner

*Primary Examiner* — Phung Nguyen
(74) *Attorney, Agent, or Firm* — Brooks, Cameron & Huebsch, PLLC (57) ABSTRACT

A system for automated house damage detection and reporting may comprise at least one subsystem configured for receiving a damage detection signal detecting potential damage to a building from at least one sensor operably connected to the building, and at least one subsystem configured for automatically communicating damage detection data using the received damage detection signal to a remote system outside the building for further analysis.

20 Claims, 7 Drawing Sheets

Fig. 7

SYSTEMS AND METHODS FOR AUTOMATED HOUSE DAMAGE DETECTION AND REPORTING

BACKGROUND

Smart house functionality is a maturing space, but the opportunity for insurance companies remains largely untapped. Currently, there are no truly useful early warning and loss mitigation systems that actually save costs and time for both the homeowner and insurance company alike. Currently, homeowners insurance claim events are detected by the homeowner, and they contact their insurance company to inform them that there has been a loss. However, further loss could be mitigated with automated warning and detection systems that interface with the insurance company systems. For example, homeowners may often never become aware of minor to medium hail damage to their roofs until such time as that damage leads to further water damage. If they could be made aware of such loss events earlier and then take corrective actions, then the increased damage and loss could have been mitigated.

In this regard, there is a need for systems and methods that overcome the shortcomings described above and others.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for automated house damage detection and reporting are described herein. For several embodiments, a system automated house damage detection and reporting may comprise at least one subsystem configured for receiving a damage detection signal detecting potential damage to a building from at least one sensor operably connected to the building, and at least one subsystem configured for automatically communicating damage detection data using the received damage detection signal to a remote system outside the building for further analysis.

Other features and embodiments are described below.

BRIEF DESCRIPTION OF THE DRAWINGS

Systems and methods for automated house damage detection and reporting are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
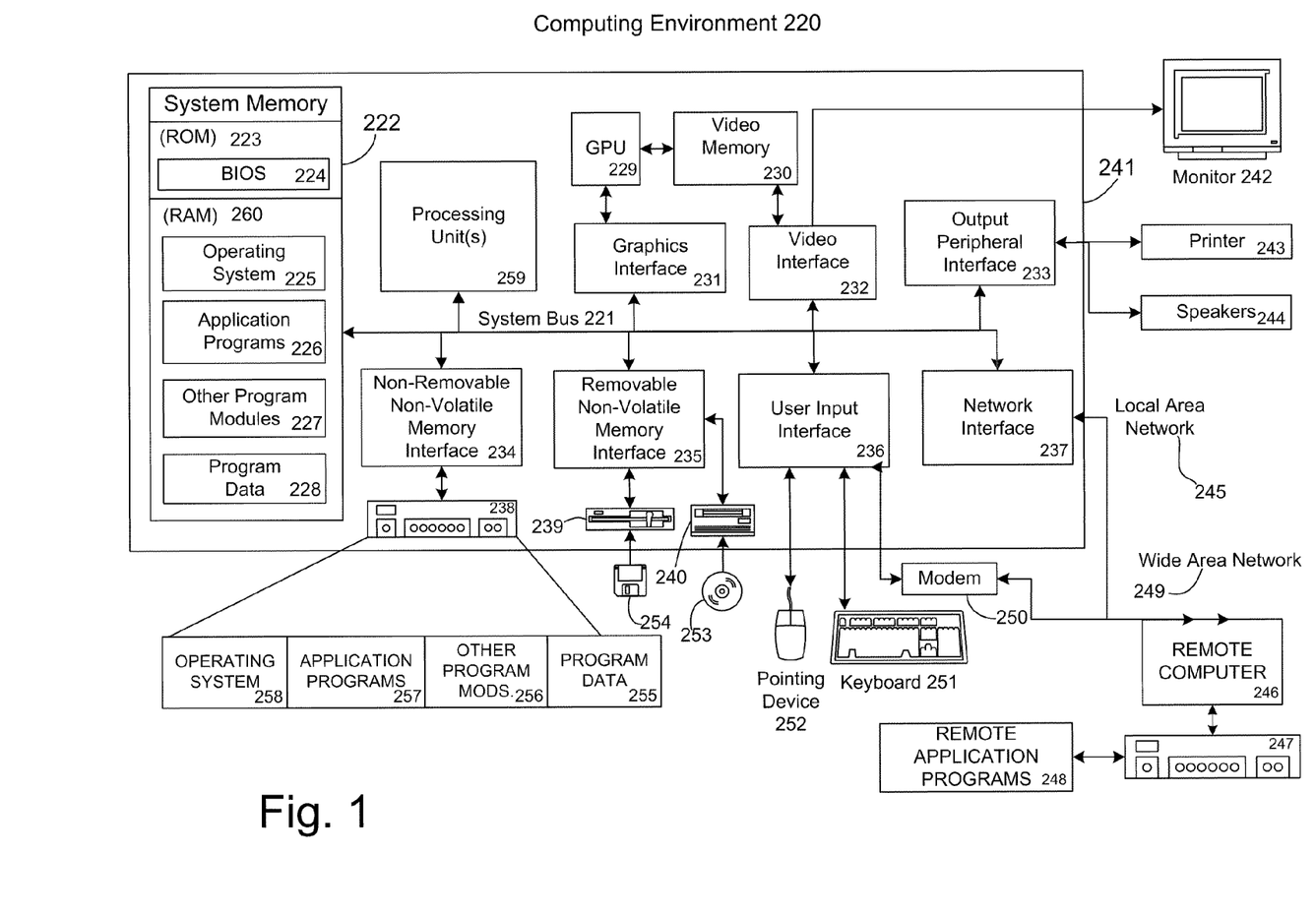
FIG. 1 is a block diagram representing an exemplary computing environment suitable for use in conjunction with implementing systems and methods for automated house damage detection and reporting.

Referring next to FIG. 1, shown is a block diagram representing an exemplary computing environment suitable for use in conjunction with implementing the processes described below. For example, the computer-executable instructions that carry out the processes and methods for automated house damage detection and reporting may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a mobile device may also include one or more items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU) 229, video memory 230, video interface 232 and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. As used herein a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform the intended function of the system or subsystem. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
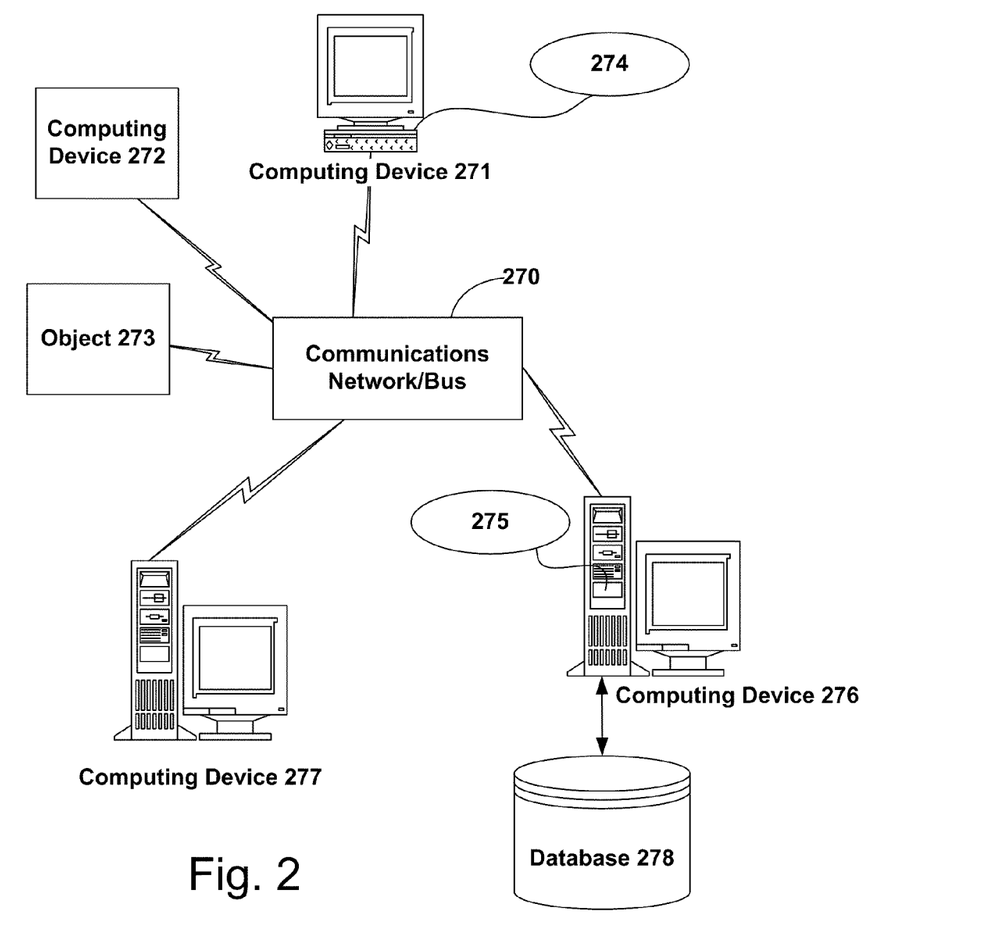
FIG. 2 illustrates an exemplary networked computing environment in which many computerized processes may be implemented to perform providing automated house damage detection and reporting.

Referring next to FIG. 2, shown is an exemplary networked computing environment in which many computerized processes may be implemented to perform the processes described below. For example, distributed or parallel computing may be part of such a networked environment with various clients on the network of FIG. 2 using and/or implementing systems and methods for automated house damage detection and reporting. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
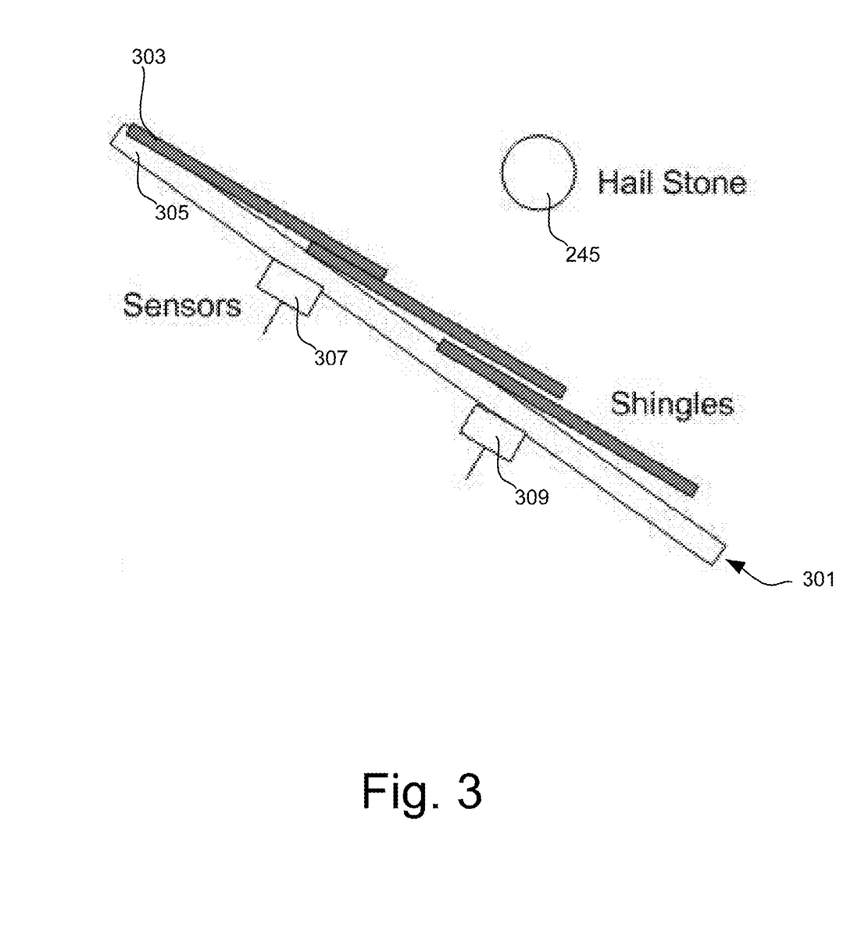
FIG. 3 is a partial, cross-sectional elevation view of an example house roof having a hail damage detection system in accordance with systems and methods for automated house damage detection and reporting.

Referring next to FIG. 3 shown is a partial, cross-sectional elevation view of an example house roof having a hail damage detection system in accordance with systems and methods for automated house damage detection and reporting. For example, the roof 301 may comprise a substrate layer 305 with a plurality of shingles 303 layered on top of the substrate 305. Below the substrate are one or more sensors 307 309 that are operable for detecting an impact on the roof (e.g., from a hail stone 245). The sensors are attached under the roof 301 such that an impact on top of the roof over a certain pressure, for example, over a specific pounds per square inch (psi), are detected by the sensors 307 309. The sensors 307 309 may be placed throughout the entire roof 301 or within a particular section or sections of the roof. Also, the sensors 307 309 may be calibrated according to the particular strength or thickness of the materials of which the roof 301 is comprised. For example, if the roof 301 is a composite roof instead of a shingle roof, the sensors 307 309 may be arranged and/or calibrated to detect a larger or smaller impacts as necessary. Also, the sensors may be placed under especially sensitive areas of the roof such as under skylights within the roof or under solar panels on the roof 301. Although there are only two example sensors 307 309 shown in FIG. 3, any number of sensors may be used as is appropriate for the particular application, cost limitations and roof conditions.

Figure 4:
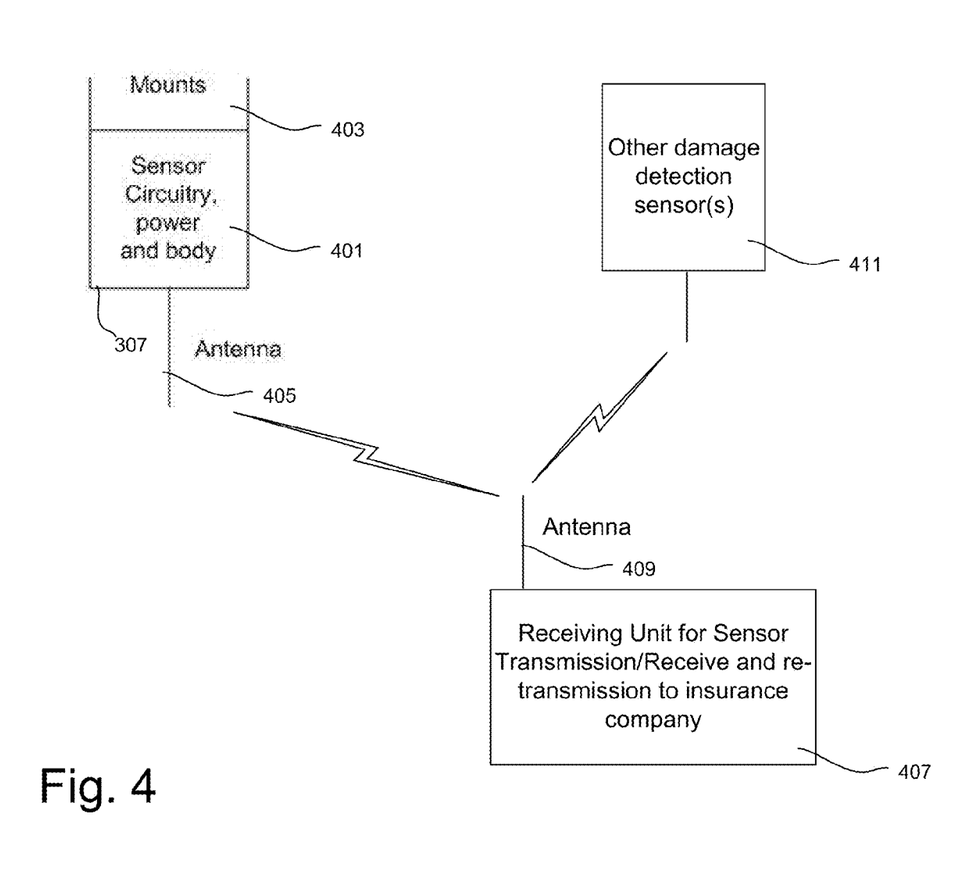
FIG. 4 is a block diagram illustrating an example system within a house for automated house damage detection and reporting.

Referring next to FIG. 4, shown is a block diagram illustrating an example system within a house for automated house damage detection and reporting. Shown is an example sensor 307, sensor body, circuitry, and power 401, sensor mounts 403 for mounting of the sensor under a roof, and a sensor antenna 405. Within the sensor body, there is circuitry that is operable for detecting and measuring impact on an impact plate of the sensor, for example. The antenna is operable for wirelessly communicating data generated by the sensor circuitry 401 regarding one or more detected impacts to a receiving unit 407. The receiving unit 407 having an operable antenna 409 may be located within the house in which the sensors are installed, for example, and is operable for collecting, interpreting and translating the data generated by the sensor circuitry 401 of one or more sensors 307 and then re-transmitting the collected translated data to another location such as an insurance company, bank, or the resident of the house for further analysis. The collected translated data may be communicated from the receiving unit 407 over any number of suitable communication channels including wired or wireless communication channels and over any number of computer networks. The communication of data between the sensor 307 and receiving unit may be via a direct wireless short range communication channel, or indirectly through a wireless local area network (LAN), public switching center, router, or other public network located outside the house. Within the damage detection data sent by the sensor 307, may be data indicating the location of the impact based on the location under the roof at which the sensor is installed. This location data may be programmed into and stored within the sensor during or after installation of the sensor 307. Also, more specific roof damage location may be determined by using an electrical grid installed underneath the shingles of a roof creating an electrical connection between each of the shingles. If an impact sensor detects damage, then the particular shingle damaged may be located by determining if and where there is a break in the electrical connection between the shingles. This break in the electrical connection may be detected by a sensor that receives radio frequency identification signals from each shingle in the electrical grid. If an RFID signal is no longer being detected by one of the shingles after the impact was detected, then it may be determined that that shingle was damaged.

Other damage detection systems and/or sensors 411 (e.g., water damage sensors, electrical system damage sensors, noise sensors for pest detection, gas leak sensors, radiation sensors, sensors to detect motion of the house during a natural disaster, water pressure sensors, sonar sensors, light sensors to detect creosote buildup, etc.) may also be installed within the house that are operable for communicating damage detection data to the receiving unit for collection, interpretation and translation of the communicated damage detection data from the other damage detection systems and/or sensors 411.

Figure 5:
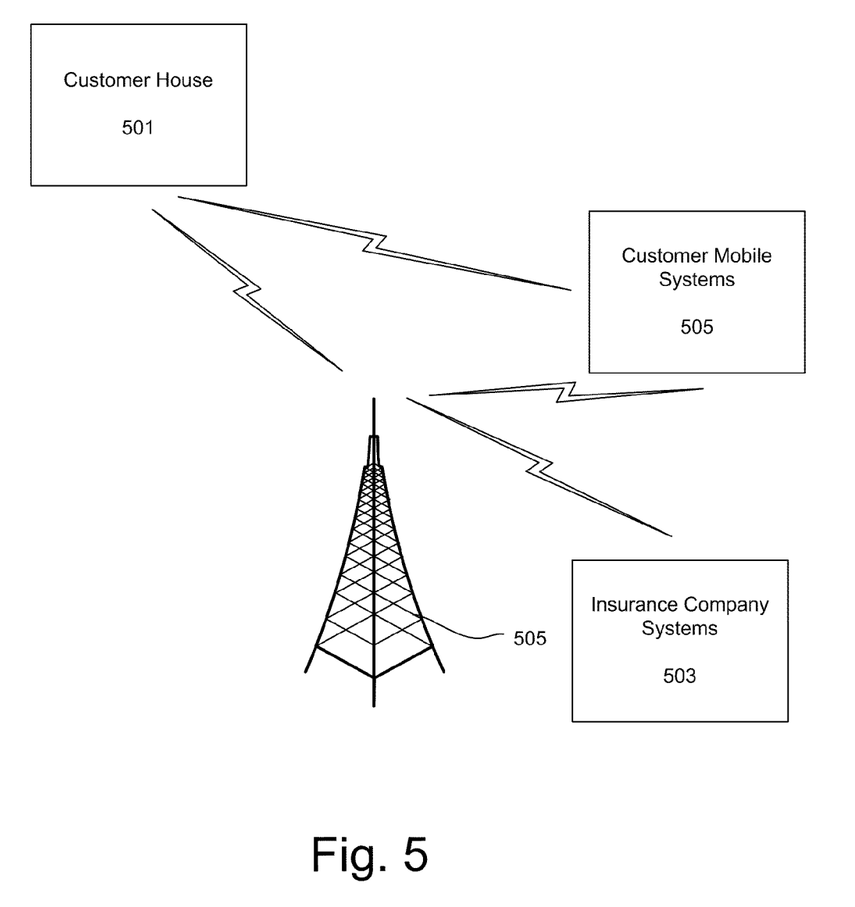
FIG. 5 is a block diagram illustrating a portion of an example system extending outside the house for automated house damage detection and reporting.

Referring next to FIG. 5, shown is a block diagram illustrating a portion of an example system extending outside the house for automated house damage detection and reporting. Shown is the customer house 501, an example radio tower 505, customer mobile computing and communication systems 505, and insurance company systems 503. The customer house 501, customer mobile computing and communication systems 505, and insurance company systems 503 may all be in operable wireless communication with each other through any number of communication channels and/or computer networks, one or more of which may be via a radio or cellular tower 505 that facilitates the automated communications. Damage detection data may be automatically communicated from the customer house systems shown in FIG. 4 (either from the sensors themselves 307 309 or from the receiving unit 407) to an insurance company 503 and/or mobile devices or computing devices of the customer 505 in order to notify the customer and take appropriate actions to prevent impending or further damage and automatically start an insurance claim using the damage detection data received.

Figure 6:
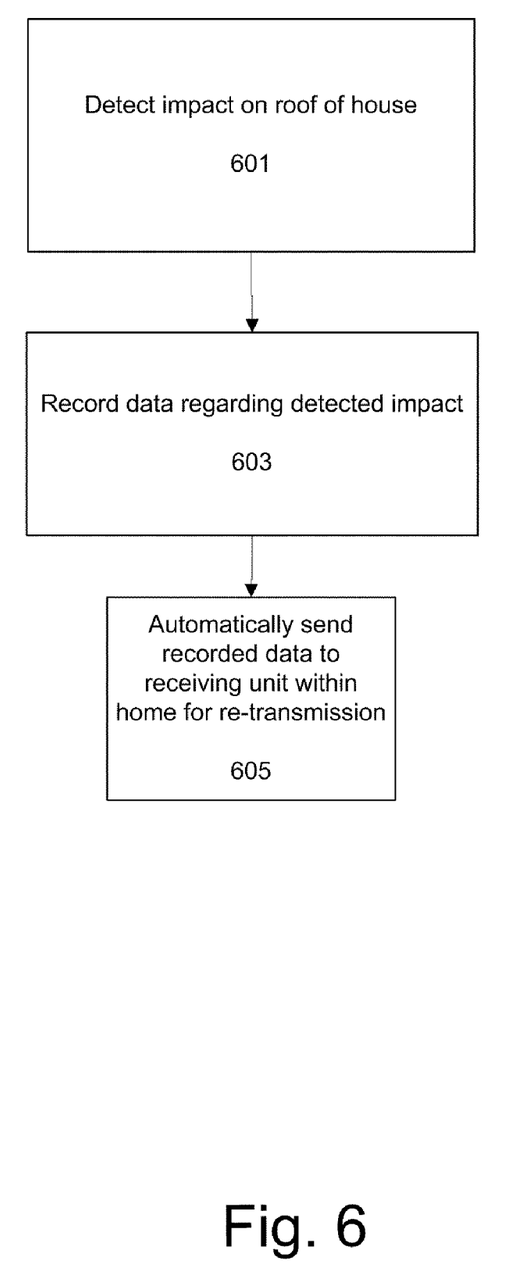
FIG. 6 is a flow chart illustrating an example process within the house for automated house damage detection and reporting.

Referring next to FIG. 6, shown is a flow chart illustrating an example process within the house for automated house damage detection and reporting. First, an impact is detected 601 on the roof of a house having a system as described above installed. Next, data is recorded 603 regarding the detected impact. For example, this data may be recorded within a sensor itself or intermediary collection unit. This recorded data may then be automatically sent 605 to a receiving unit that may be operable for collecting, interpreting and re-transmitting data from a plurality or variety of different sensors within a particular house.

Figure 7:
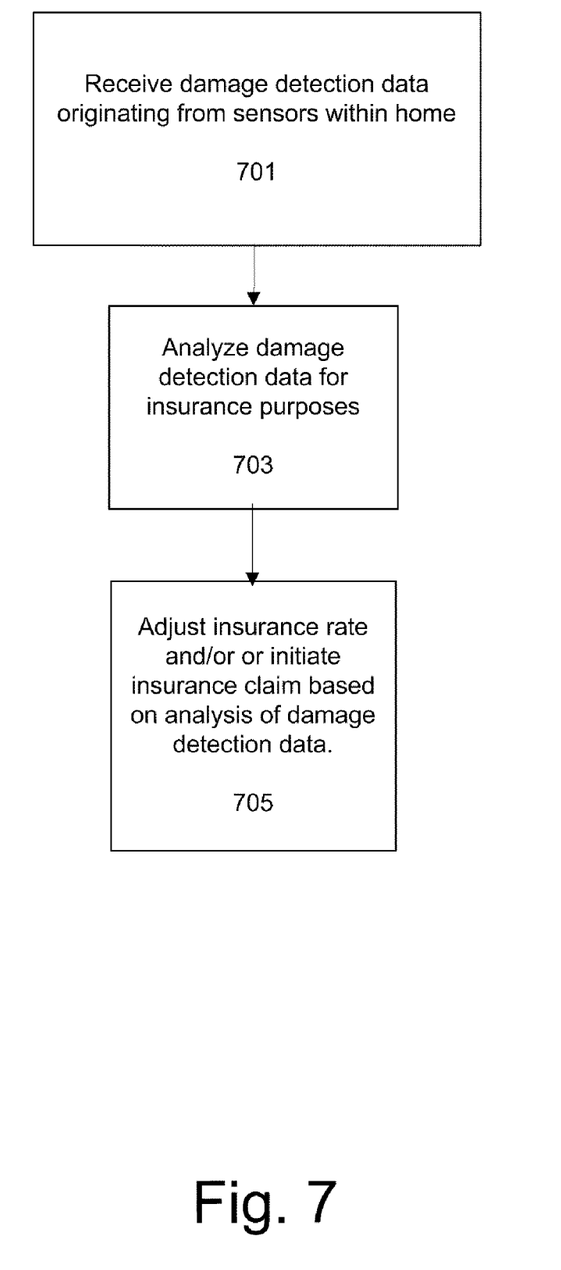
FIG. 7 is a flow chart illustrating an example process for automated house damage detection and reporting to an insurance company.

Referring next to FIG. 7, shown is a flow chart illustrating an example process for automated house damage detection and reporting to an insurance company. First, damage detection data that had originated from sensors within a house is received 701. The damage detection data is then analyzed 703 for insurance purposes. This analysis may be automated and may include, but is not limited to, one or more of the following: checking local weather conditions in an area surrounding the location at which the damage was detected, determining the extent of damage, determining whether to automatically initiate an insurance claim, determining frequency of damage detection data reports received from a particular house, determining frequency of damage detection data reports received from a particular area, determining type of damage based on weather conditions and type of damage detection data, etc.

Next an insurance rate may be adjusted and/or insurance claim initiated 705 using the analysis of damage detection data. This analysis may be, for example, analysis of damage detection data received over a particular period of time from a particular house, neighborhood or other specific area. Using the extent, type and frequency of damage detection data received, insurance rates may be adjusted 705 for the particular house, neighborhood or other specific area It is noted that the foregoing examples have been provided merely for the purposes of explanation and are in no way to be construed as limiting of the present invention. While the invention has been described with reference to various embodiments, it is understood that the words which have been used herein are words of description and illustration, rather than words of limitations. Further, although embodiments have been described herein with reference to particular means and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A non-transitory computer readable medium having computer executable instructions thereon for:
   receiving a signal detecting potential damage to a building from at least one sensor operably connected to the building;
   automatically communicating damage detection data using the received damage detection signal to a remote system outside the building for further analysis; and
   automatically initiating an insurance claim using the analysis of damage detection data.

2. The non-transitory computer readable medium of claim 1, wherein the at least one sensor is an impact sensor for detecting impacts on a roof of the building.

3. The non-transitory computer readable medium of claim 1, wherein the remote system outside the building is an insurance company system.

4. The non-transitory computer readable medium of claim 1, wherein the computer executable instructions thereon for automatically communicating damage detection data using the received damage detection signal comprise computer executable instructions for:
   collecting and storing the signal in order to associate it with previous damage detection signals received; and
   interpreting the signal to create damage detection data understood by the remote system outside the building for further analysis.

5. The non-transitory computer readable medium of claim 1, wherein the remote system outside the building is a mobile device of a person associated with the building.

6. The non-transitory computer readable medium of claim 1, wherein the signal is received wirelessly from the at least one sensor.

7. The non-transitory computer readable medium of claim 1, further having computer executable instructions thereon for receiving the signal detecting potential damage to the building from another sensor operably connected to the building for detecting damage of a different type than that of the at least one sensor.

8. A non-transitory computer readable medium having computer executable instructions thereon for:
   receiving damage detection data originating from at least one sensor within a building for detecting potential damage to the building;
   automatically analyzing the damage detection data for insurance purposes; and
   automatically initiating an insurance claim using the analysis of damage detection data.

9. The non-transitory computer readable medium of claim 8, further comprising computer executable instructions thereon for automatically adjusting an insurance rate using the analysis of damage detection data.

10. The non-transitory computer readable medium of claim 8, wherein the computer executable instructions thereon for automatically adjusting an insurance rate using the analysis of damage detection data comprise computer executable instructions for adjusting the insurance rate for a particular house, neighborhood or other specific area using extent, type and frequency of damage detection data received over time from the particular house, neighborhood or other specific area.

11. The non-transitory computer readable medium of claim 8, wherein the computer executable instructions thereon for automatically analyzing comprise computer executable instructions for automatically analyzing the damage detection data using automatic performance one or more of the following: checking local weather conditions in an area surrounding a location at which the damage was detected, determining an extent of damage, determining whether to automatically initiate an insurance claim, determining frequency of damage detection data reports received from a particular house, determining frequency of damage detection data reports received from a particular area, and determining type of damage using weather conditions and type of damage detection data received.

12. The non-transitory computer readable medium of claim 8, wherein the at least one sensor is an impact sensor connected to a roof of the building for detecting potential damage by impacts to the roof of the building.

13. The non-transitory computer readable medium of claim 8, further comprising computer executable instructions thereon for receiving damage detection data detecting potential damage to the building from another sensor operably connected to the building for detecting damage of a different type than that of the at least one sensor.

14. A system for detecting potential damage to a building comprising:
   at least one impact sensor operable for connection to an underside of a roof of the building for detecting impacts to the top of the roof;
   at least one receiving unit in operable communication with the at least one impact sensor, said receiving unit operable for receiving impact sensor data detecting impacts to the roof and operable for re-transmitting the impact sensor data to a remote system and in a format understood by the remote system;

at least one subsystem configured to analyse damage detection data, wherein the damage detection data includes the impact sensor data; and at least one subsystem configured to automatically initiate an insurance claim using the analysis of damage detection data.

15. The system of claim 14, wherein the at least one impact sensor is in operable wireless communication with the receiving unit.

16. The system of claim 14, further comprising additional impact sensors for connection to the underside of the roof and operable for communicating data regarding location on the roof of a detected impact.

17. The system of claim 14, further comprising additional sensors connected to the building in operable communication with the receiving unit, wherein one or more of the additional sensors is of the following type of sensor: water damage sensor, electrical system damage sensor, noise sensor for pest detection, gas leak sensor, radiation sensor, sensor to detect motion of the house during a natural disaster, water pressure sensor, sonar sensor, and light sensor to detect creosote buildup.

18. The system of claim 14, wherein the impact sensor comprises:

a sensor body;

an impact plate within the sensor body;

sensor circuitry within the sensor body for detecting impacts to the impact plate and generating damage detection signals and wireless communication of the damage detection signals; and an antenna connected to the circuitry for facilitating communication of the damage detection signals wirelessly.

19. The system of claim 14, further comprising an electrical grid for installation underneath shingles of the roof creating an electrical connection between each of the shingles and wirelessly connected to the receiving unit whereby, if the impact sensor detects damage, then a particular shingle damaged may be located by the receiving unit determining if and where there is a break in the electrical connection between the shingles after the receiving impact sensor data detecting impacts to the roof.

20. The system of claim 14, wherein the remote system is that of an insurance company.

* * * * *